Patented Aug. 6, 1929.

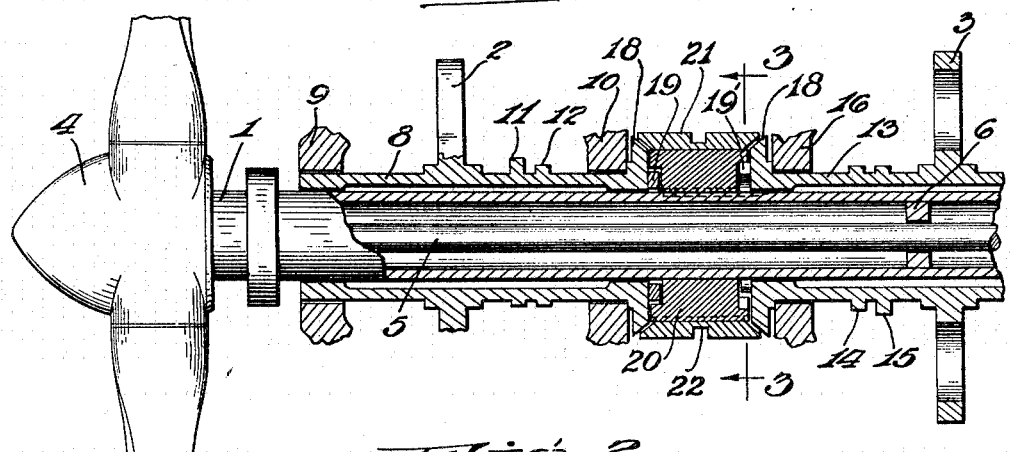
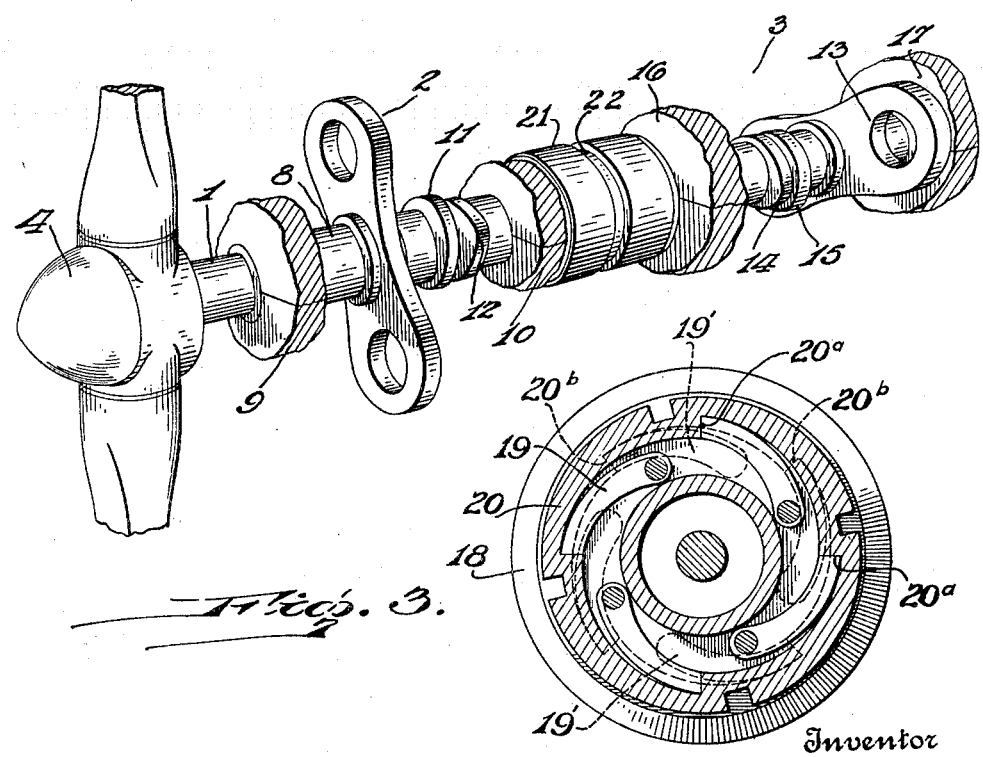

1,723,925

UNITED STATES PATENT OFFICE.

SHERMAN MILLS FAIRCHILD, OF NEW YORK, N. Y.

AIRPLANE-PROPELLING MEANS.

Application filed November 25, 1927. Serial No. 235,549.

This invention relates to engine mounting for air-craft and other uses.

Heretofore in order to drive a common propeller shaft by a plurality of engines it has been customary to transmit the drive to the shaft by gearing, chain or belt drive, etc. with a consequent increase in weight, loss of power, and uncertainty of operation.

One of the objects of my invention is to mount the operating cams of a plurality of cam engines directly on a common shaft and connected thereto by overrunning clutches. This arrangement produces a very sturdy construction, obviates power loss and uncertainty of chains, belts and gearing and produces a very compact and rigid unit of relatively light weight.

Another object of my invention is to provide a manually operable clutch between each cam and the common shaft whereby said cams may be coupled to said shaft at will.

Another object of this invention is to provide in connection with a cam engine a variable pitch propeller controlled thru the main engine shaft.

Other objects and advantages of this invention will become apparent from the following specification, claims and appended drawings, in which:—

Fig. 1 is a fragmentary view partly in section showing the main shaft, driving cams, clutches and propeller control mechanism.

Fig. 2 is a perspective view of the propeller main shaft, driving cams, clutches, etc.

Fig. 3 is a sectional view on the line 3—3 of Fig. 1.

In the drawings only as much of the cam engines is shown as is necessary for an understanding of the invention. This has been done in order to simplify the drawings and bring out the invention more clearly.

Referring to the drawings it will be seen that a common shaft 1 is provided upon which is mounted the driving cam 2 of a cam engine and the driving cam 3 of a second cam engine. Upon the left hand end of the shaft 1, as illustrated in Figs. 1 and 2, a variable pitch propeller 4 is secured. The shaft 1 is formed hollow as is clearly shown in Fig. 1 and a rod 5 for varying the pitch of the variable pitch propeller 4 extends thru the shaft 1. Suitable bearings may, of course, be provided within the shaft 1 for supporting the rod 5. In Fig. 1, I have illustrated such a bearing and designated the same by the numeral 6. The details of the variable pitch mechanism of the propeller 4 form no part of this invention and therefore are not illustrated. It is sufficient that the control for varying the pitch is shown as passing thru the hollow shaft 1.

The driving cam 2 of one of the cam engines is mounted on the shaft 1 by a sleeve 8 as is clearly shown in Fig. 1. This sleeve 8 is supported in bearings formed in the engine crank case. The bearing adjacent the propeller 4 being designated in the drawings by the numeral 9 and the bearing for the opposite end of the sleeve is designated by the numeral 10. These bearings may be of any suitable character but for the sake of simplicity plain split bearings are illustrated in the drawings. The sleeve 8 also carries two operating cams for the valve mechanism of this cam engine. These are designated by the numerals 11 and 12. It will be noted that the sleeve 8 forms a supporting bearing for the shaft 1. The sleeve 8 is adapted to be operatively connected to the shaft 1 by an overrunning clutch and also by a manually operable clutch. This clutch will be described hereinafter.

The driving cam 3 of another cam engine is also mounted on the shaft 1 to the right, as shown in Figs. 1 and 2, of the driving cam 2 of the first cam engine. This driving cam 3 is mounted upon the shaft in a manner similar to the driving cam 2, that is by a sleeve designated by the numeral 13 in the drawing. The sleeve 13 carries the valve operating cams 14, 15 for this cam engine. The sleeve 13 is mounted in bearings 16 and 17 of a crank-case which if desired may be made unitary with the crank-case of the first cam engine or may be formed separate therefrom. The sleeve 13 serves to support the shaft 1 in a manner similar to the sleeve 8. The sleeve 13 is connected to the shaft 1 by an overrunning clutch and also by manually operated clutch in a manner similar to the sleeve 8.

The overrunning and manually operable clutch mechanisms may be of any approved design. The embodiment of clutch mechanisms shown in the drawings comprise a dog and tooth clutch mechanism between the sleeve 8 of the shaft 1 and a similar clutch mechanism between the sleeve 13 of the shaft 1. Each of these clutches comprises a disc member 18 mounted on the respective sleeve and a member 20 mounted on the shaft 1. If desired the member 20 of both clutches may be formed as a single unit one end serving one clutch and the other serving the other clutch. This construction is shown in the drawings.

A dog or plurality of dog members 19 are pivoted to the disc 18 on the sleeve 8 and cooperate with internal teeth 20ª on the member 20. A similar dog or plurality of dogs 19' are pivotally mounted on the disc 18 of the sleeve 13 and cooperate with internal teeth 20ᵇ on the member 20. These dogs are thrown outward against the internal teeth by centrifugal force as the sleeve rotates and engage said teeth in driving relation whenever the speed of rotation of the sleeve is equal to that of the shaft. At all other times the shaft 1 is permitted free overrunning motion.

As is clearly shown in Figs. 3 the internal teeth 20ª cooperating with the dogs 19 of the sleeve 8 are spaced circumferentially from the internal teeth 20ᵇ cooperating with the dogs 19' of the sleeve 13. This feature causes the engines to make up in overlapping phase, that is, the explosive impulses of one engine occur between those of the other engine thus producing a very even torque. If more than two cam engines are used the internal teeth of all clutches will, of course, be staggered circumferentially in relation to the teeth of the other clutches.

As shown in Fig. 1 a manually operable clutch member 21 is provided for coupling either the sleeve 8 or 13 to the shaft 1. As illustrated in this figure, this clutch comprises an annular clutching member splined to the member 20 of the overrunning clutches and slidable axially thereon. The edges of the discs 18 of the sleeves 8 and 13 adjacent the member 21 are chamfered as shown in Fig. 1 and the member 21 is also beveled to form a surface for engaging with the chamfered edges of the discs. Any suitable means may be provided for shifting the member 21 into engagement with the adjacent disc on the sleeve 8 or 13 thus coupling the sleeve 8 or 13 to the shaft 1 thru the medium of the member 20 of the overrunning clutch.

It is obvious that a separate clutch member 21 may be provided for each sleeve instead of using a common member as is shown in the drawing. Such a structure would permit a manual coupling of either or both of the cam engines to the shaft 1 at will. The clutch member as shown in the drawings is provided with an annular peripheral groove 22 for cooperating with manually actuating means.

The manually operable clutches permit the coupling of any engine to the shaft 1 at any time. This feature is especially useful in starting the motors as it is only necessary to provide a starting device of sufficient power to start one engine. The other engines may then be coupled as desired to the shaft 1 and started by the power of the first engine. The starting device is preferably connected to the shaft 1 and may therefore start any desired engine. I do not desire to limit myself in this respect and wish it to be understood that if desired a separate starting device may be provided for each motor and arranged for starting said motors directly.

The manually operable clutches may also be used to connect the motors to the shaft 1 in addition to the overrunning clutches under ordinary running conditions. By thus connecting the motors to the shaft 1 the motors will be constrained to rotate at the same speed as the shaft 1 and no lost motion will be present upon acceleration from low speeds. This arrangement also prevents stalling of one or more of the motors at low speeds. As long as the shaft 1 rotates the motors of course rotate with it.

I also wish it to be understood that it is within the scope of this invention to provide single dog and teeth clutches and to so orient the teeth of the respective clutches that the engines will fire opposed, that is when a given cylinder of one engine is firing the diametrically opposite cylinder of another engine is firing thus balancing the impulse.

I also wish it to be understood that I do not desire to limit myself to the specific type of clutch mechanisms shown as I am well aware that many other types of clutch mechanisms may be used and especially do I desire not to limit myself in connection with any specific type of manually operable clutch for connecting the respective sleeves to the main shaft 1.

The variable pitch propeller combined with the cam engines and mounted directly on the propeller shaft provides a very flexible and efficient unit. The pitch of the propeller may be varied in relation to the number of engines working and thus maintain high efficiency. The operating means for varying the pitch of the propeller passes thru the main shaft 1 which would be impossible with engines of the crank shaft type.

Various changes in the construction of the embodiment illustrated in the drawings may be made without departing from the spirit of the invention, and I do not therefore desire to limit myself to the specific construction shown and described, but to interpret the invention broadly within the scope of the appended claims.

What I claim as my invention is:

1. In an airplane, a hollow propeller shaft, a variable pitch propeller mounted on said shaft, a control rod for varying the propeller pitch extending thru said propeller shaft, a plurality of cam engines for driving said propeller each engine including a drive cam loosely mounted on said propeller shaft, a separate overrunning clutch connecting each drive cam to said propeller shaft, and a positive manually operable clutch for connecting each cam to said propeller shaft.

2. In an airplane, a hollow propeller shaft, a variable pitch propeller mounted on said shaft, a control rod for varying the propeller pitch extending thru said propeller shaft, a plurality of cam engines for driving said propeller each engine including a drive cam loosely mounted on said propeller shaft, a separate overrunning clutch connecting each drive cam to said propeller shaft.

3. In an aircraft, a propeller shaft, a propeller mounted on said shaft, a plurality of cam engines each engine including a driving cam for driving said propeller mounted on said shaft and connected thereto by a separate overrunning clutch and means for positively coupling any desired cam to said propeller shaft.

4. In an aircraft, a propeller shaft, a propeller mounted on said shaft, a plurality of cam engines each engine including a driving cam for driving said propeller mounted on said propeller shaft and connected thereto by a separate overrunning clutch.

5. In a power plant, a shaft, a plurality of cam engines for driving said shaft each engine including a driving cam mounted on said shaft and clutch means for connecting said driving cams to said shaft.

6. In a device of the class described, the combination with a plurality of cam engines including drive cams mounted on a common shaft and connected to said shaft by overrunning clutches positioned with the point of driving engagement of each clutch displaced circumferentially of the shaft from that of each other clutch.

In testimony whereof I affix my signature.

SHERMAN MILLS FAIRCHILD.